US009777169B2

(12) United States Patent
Andersen et al.

(10) Patent No.: US 9,777,169 B2
(45) Date of Patent: Oct. 3, 2017

(54) ALPHA,OMEGA-HYDROXY-FUNCTIONALIZED OLIGOESTER AS ADHESION PROMOTER IN SOLVENTBORNE FILLERS

(71) Applicant: BASF Coatings GmbH, Münster (DE)

(72) Inventors: Audrée Andersen, Münster (DE); Cathrin Corten, Münster (DE); Markus Saedler, Münster (DE); Fatmir Raka, Münster (DE); Frederik Fölling, Münster (DE); Nicole Freitag, Münster (DE); Stefanie Boshe-Plois, Ochtrup (DE); Alexandra Steffens, Münster (DE)

(73) Assignee: BASF Coatings GmbH, Münster (DE)

( * ) Notice: Subject to any disclaimer, the term of this patent is extended or adjusted under 35 U.S.C. 154(b) by 102 days.

(21) Appl. No.: 14/766,554

(22) PCT Filed: Feb. 7, 2014

(86) PCT No.: PCT/EP2014/052460
§ 371 (c)(1),
(2) Date: Aug. 7, 2015

(87) PCT Pub. No.: WO2014/122276
PCT Pub. Date: Aug. 14, 2014

(65) Prior Publication Data
US 2015/0368485 A1 Dec. 24, 2015

Related U.S. Application Data

(60) Provisional application No. 61/761,763, filed on Feb. 7, 2013.

(30) Foreign Application Priority Data

Feb. 7, 2013 (EP) ..................... 13154443

(51) Int. Cl.
B32B 27/06 (2006.01)
C09D 7/12 (2006.01)
C09D 5/00 (2006.01)
B05D 7/00 (2006.01)
C08K 5/11 (2006.01)

(52) U.S. Cl.
CPC ............. *C09D 7/1233* (2013.01); *C09D 5/00* (2013.01); *B05D 7/534* (2013.01); *C08K 5/11* (2013.01); *Y10T 428/31786* (2015.04)

(58) Field of Classification Search
CPC .......... C09D 5/00; C09D 7/1233; C09D 7/12; C08K 5/11; B05D 7/534; Y10T 428/31786
See application file for complete search history.

(56) References Cited

U.S. PATENT DOCUMENTS

| 6,652,915 B1 | 11/2003 | Baumgart et al. |
| 6,930,161 B2 | 8/2005 | Schwarte et al. |
| 7,049,370 B2 | 5/2006 | Lettmann et al. |
| 2006/0069202 A1 | 3/2006 | Becker et al. |

FOREIGN PATENT DOCUMENTS

| DE | 1992-4172 | 11/2000 |
| EP | 2075075 | 7/2009 |
| JP | 2010-227753 | 10/2010 |
| WO | WO-02/20637 | 3/2002 |
| WO | WO-03/029319 | 4/2003 |
| WO | WO-2010/046333 | 4/2010 |
| WO | WO-2013/124322 | 8/2013 |

OTHER PUBLICATIONS

Determination of Hydroxyl Value—Part 2: Method with Catalyst, DIN 53240-2, Nov. 2007, 8 pages.
Paints Varnishes and Plastics—Determination of Non-Volatile-Matter Content, DIN EN ISO 3251, Jun. 2008, 14 pages.
Römpp-Lexikon Lacke und Druckfarben, Georg Thieme Verlag, Stuttgart, New York, 1998, 73-74.
Römpp-Lexikon Lacke und Druckfarben, Georg Thieme Verlag, Stuttgart, New York, 1998, 196-197.
Römpp-Lexikon Lacke und Druckfarben, Georg Thieme Verlag, Stuttgart, New York, 1998, 250-252.
Paints and Varnishes—Coatings for Automotive Industry—Testing of Resistance to Pressure-Weather Jetting, DIN EN ISO 5662, 20 pages.
Paints and Varnishes—Determination of Resistance to Humidity, Part 2: Procedure for Exposing Test Specimens in Condensation-Water Atmospheres DIN EN ISO 6270-2, 12 pages.
Binders for Paints and Varnishes—Determination of Acid Value, Titrimetric Method, DIN EN ISO 3682 (replaced DIN 53402), Jun. 1998, 6 pages.
Paints and Varnishes—Cross-Cut Test, DIN EN ISO 2409, 21 pages, 2013.
PCT International Preliminary Report on Patentability in PCT/EP2014/052460, dated Aug. 11, 2015, 10 pages.

(Continued)

*Primary Examiner* — Shane Fang
(74) *Attorney, Agent, or Firm* — Servilla Whitney LLC

(57) ABSTRACT

Solventborne filler comprises at least one alpha,omega-hydroxy-functionalized oligoester which possesses an OH number of 30 to 160 mg KOH/g, a theoretical carbon-carbon double bond content of 1 to 3 mmol/g, a number-average molecular weight of 1000 to 3000 g/mol and a weight-average molecular weight of 2800 to 10 000 g/mol, moreover, the sum of the weight percentage fractions of all the alpha,omega-hydroxy-functionalized oligoesters being 0.5 to 10 wt. %, based on the total amount of the solventborne filler. Also provided are a multicoat paint system, a process for producing a multicoat paint system, and use of the above-designated alpha,omega-hydroxy-functionalized oligoester in solventborne fillers for improving adhesion.

15 Claims, No Drawings

(56) References Cited

OTHER PUBLICATIONS

PCT International Search Report in PCT/EP2014/052460, mailed Mar. 27, 2014, 4 pages.

ALPHA,OMEGA-HYDROXY-FUNCTIONALIZED OLIGOESTER AS ADHESION PROMOTER IN SOLVENTBORNE FILLERS

CROSS-REFERENCE TO RELATED APPLICATIONS

This application is the National Stage entry of PCT/EP2014/052460, filed on Feb. 7, 2014, which claims priority to European Application Number 13154443.9, filed on Feb. 7, 2013, and U.S. Ser. No. 61/761,763 filed on Feb. 7, 2013, which are incorporated herein by reference in their entireties.

TECHNICAL FIELD

The invention relates to a solventborne filler. It further relates to a process for producing a multicoat paint system on a substrate, and also to a multicoat paint system on a substrate. Lastly, the present invention relates to the use of an alpha,omega-hydroxy-functionalized oligoester for improving adhesion in a solventborne filler.

BACKGROUND

The paint system of commercial vehicles is subject to exacting requirements. In a typical system, atop a metal substrate optionally coated with an electrocoat, a filler coat and a topcoat are applied. The topcoat typically unites the functions of a basecoat and a clearcoat with one another. Accordingly, a topcoat comprises pigments, for example, and therefore substantially governs the overall color impression given by the finish. Moreover, it also possesses typical properties characteristic of a clearcoat, such as a corresponding scratch resistance, for example.

Both the filler and the topcoat are typically solvent-based systems. In many cases, the finishing of commercial vehicles is not automated. This means that the coating materials in question are applied by hand—that is, for example, by means of spray application. In such cases, two-component paint systems are principally used that permit curing at moderate temperatures. In a resultant finish, the adhesion between filler coat and topcoat continues to be a major problem.

SUMMARY

It is an object of the present invention, accordingly, to improve the adhesion between the filler coat and its adjacent coats. The object more particularly was to improve the adhesion between the filler coat and the topcoat. This is to be achieved through the use of adhesion promoters in the filler.

The adhesion between filler coat and topcoat is also to be retained following any exposure of the substrate, as after weathering, for example. Furthermore, the filler containing the adhesion promoter is to have an excellent shelf life. This means in particular that after months of storage there should be no significant deterioration recorded in the attainable improvement in adhesion.

This object is achieved, surprisingly, by means of a solventborne filler which comprises at least one alpha,omega-hydroxy-functionalized oligoester which possesses an OH number of 30 to 160 mg KOH/g, a theoretical carbon-carbon double bond content of 1 to 3 mmol/g, a number-average molecular weight of 1000 to 3000 g/mol and a weight-average molecular weight of 2800 to 10 000 g/mol, the sum of the weight percentage fractions of all the alpha,omega-hydroxy-functionalized oligoesters being 0.5 to 10 wt. %, based on the total amount of the solventborne filler.

DETAILED DESCRIPTION

The term "alpha,omega-hydroxy-functionalized oligoester" refers to an oligoester with a hydroxyl group located at each of its opposite ends, referred to as alpha and omega respectively. This means that such an oligoester is terminated at both ends in each case by a monomer unit which bears precisely one hydroxyl group. If the oligoester is a branched oligoester, then alpha and omega denote the ends of the longest polymer chain within the monomer. The length here is measured on the basis of the number of monomers incorporated. Moreover, the possession by said alpha,omega-hydroxy-functionalized oligoester of further hydroxyl groups is not ruled out. It is preferred for the alpha,omega-hydroxy-functionalized oligoester for use in accordance with the invention to possess precisely two hydroxyl groups, one in alpha- and one in omega-position. It is particularly preferred for the alpha,omega-hydroxy-functionalized oligoester for use in accordance with the invention to possess precisely two hydroxyl groups, one in alpha- and one in omega-position, and, moreover, to be linear.

The alpha,omega-hydroxy-functionalized oligoester for use in accordance with the invention preferably possesses an OH number of 40 to 160 mg KOH/g and more preferably of 70 to 150 mg KOH/g. The OH number may be determined in accordance with DIN 53240 as follows: the OH groups are reacted by acetylation with an excess of acetic anhydride. The excess acetic anhydride is subsequently cleaved to form acetic acid by addition of water, and the entire acetic acid is back-titrated with ethanolic KOH. The OH number indicates the amount of KOH, in mg, which is equivalent to the amount of acetic acid bound in the acetylation of 1 g of substance.

Moreover, the alpha,omega-hydroxy-functionalized oligoester for use in accordance with the invention possesses an acid number of preferably 0 to 10 mg KOH/g, more preferably 0 to 5 mg KOH/g and very preferably 0 to 3 mg KOH/g. The acid number is determined in accordance with DIN 53402. In that determination, the free acids present in the sample are titrated with a potassium hydroxide standard solution in the presence of a color indicator. The acid number corresponds to the mass of potassium hydroxide, in mg, which is needed to neutralize 1 g of alpha,omega-hydroxy-functionalized oligoester under specified conditions.

The alpha,omega-hydroxy-functionalized oligoester additionally possesses a preferred number-average molecular weight of 1000 to 2800 g/mol and more preferably of 1200 to 2600 g/mol and also a weight-average molecular weight of preferably 3000 to 8000 g/mol and more preferably 3000 to 7500 g/mol. The number-weighted and mass-weighted molecular weights are determined by means of gel permeation chromatography with tetrahydrofuran as eluent, using polystyrene standards. The column material consists of styrene-divinylbenzene copolymers.

With regard to the ranges defined in this patent application for the number-average and weight-average molecular weights, it may be indicated at this point that the skilled person will be clear that the only possible combinations in each case of the number-average and weight-average molecular weights are those for which the number-weighted molecular weight is not greater than the weight-average molecular weight.

It is essential to the invention that said alpha,omega-hydroxy-functionalized oligoester possesses a theoretical carbon-carbon double bond content of 1 to 3 mmol/g, preferably of 1.4 to 2.5 mmol/g and more preferably of 1.6 to 2.3 mmol/g. The theoretical carbon-carbon double bond content is the amount of substance of the carbon-carbon double bonds, with mmol as the unit, relative to the mass of the alpha,omega-hydroxy-functionalized oligoester, with gram as the unit. For the purposes of the present invention, carbon-carbon double bonds are not considered to include any that are formally part of an aromatic ring. Thus, for example, the three carbon-carbon double bonds formally present in a benzene ring remain unregarded in the calculation of the theoretical carbon-carbon double bond content. The theoretical carbon-carbon double bond content, referred to as double bond content in the formula set out below, is calculated as follows:

$$\text{Double bond content} = \frac{\text{Amount of substance (double bonds)}}{\text{Mass(oligoester)}}.$$

The expression "amount of substance(double bonds)" here denotes the amount of substance of the carbon-carbon double bonds, with mmol as the unit, and the expression "mass(oligoester)" denotes the mass of the alpha,omega-hydroxy-functionalized oligoester, with gram as the unit.

The mass of the alpha,omega-hydroxy-functionalized oligoester is the sum of the masses of the monomers used in its preparation, minus the mass of the water formed during that preparation, on the assumption of complete conversion of all the anhydride groups and/or carboxylic acid groups. The amount of substance of the carbon-carbon double bonds is given by the amount of substance of the unsaturated monomers used. Where, for example, exclusively singly unsaturated monomers are used, such as maleic anhydride, for example, the amount of substance of the carbon-carbon double bonds is equal to the amount of substance of the unsaturated monomers used. Where, for example, doubly unsaturated monomers are used, the amount of substance of the carbon-carbon double bonds introduced by such monomers into the alpha,omega-hydroxy-functionalized oligoester is twice the amount of substance of the corresponding doubly unsaturated monomer that is used.

The alpha,omega-hydroxy-functionalized oligoester can be prepared, for example, from the reaction of polycarboxylic acids with polyols. It is preferably prepared from reaction of dicarboxylic acids, and also their anhydrides, and diols, triols and also monohydroxy-functional compounds. Preference is given to using diols.

Where the preparation of the alpha,omega-hydroxy-functionalized oligoester takes place with dicarboxylic acids, then it is also possible in principle to use their anhydrides. In the text below, therefore, the term "dicarboxylic acid" should be understood to likewise include the corresponding anhydride. It is part of the general knowledge of a person of ordinary skill in the art to decide to use the compounds in question either as dicarboxylic acid or as anhydride.

Dicarboxylic Acids

The dicarboxylic acids for use in accordance with the invention may be aromatic or aliphatic compounds. In the case of aliphatic compounds, the compounds in question contain no aromatic groups, such as a benzene radical, for example. An aromatic compound for the purposes of the present invention is understood to encompass all those which contain at least one aromatic group, such as a benzene radical, for example. As an example of an aromatic compound, mention may be made, for example, of the constitutional isomers of benzene dicarboxylic acid that are known to the skilled person, and also terephthalic anhydride.

Aliphatic dicarboxylic acids are preferred. With particular preference said aliphatic dicarboxylic acids are saturated or singly or plurally unsaturated. With very particular preference they are linear aliphatic dicarboxylic acids which are either saturated or singly or plurally unsaturated. In addition it is also possible to use cycloaliphatic dicarboxylic acids.

It is further preferred for at least one saturated and at least one singly or plurally unsaturated aliphatic dicarboxylic acid to be used.

With particular preference, at least one saturated linear aliphatic dicarboxylic acid and at least one singly or plurally unsaturated linear aliphatic dicarboxylic acid are used.

With particular preference at least one saturated and at least one singly or plurally unsaturated aliphatic dicarboxylic acid are used. With very particular preference, at least one saturated linear and at least one singly or plurally unsaturated linear aliphatic dicarboxylic acid are used.

The molar ratio of saturated to singly and/or plurally unsaturated aliphatic dicarboxylic acids is preferably 0.5:1.5 to 1.5:0.5, more preferably 0.75:1.25 to 1.25:0.75 and very preferably 0.9:1.1 to 1.1:0.9. The stated ratios relate both to the case where more than one saturated and/or more than one unsaturated dicarboxylic acid are used, and to the case where precisely one saturated and precisely one unsaturated dicarboxylic acid are used.

Saturated aliphatic dicarboxylic acids used are preferably those having 4 to 18, more preferably 6 to 14 and very preferably 6 to 10 carbon atoms. With particular preference these are linear saturated aliphatic dicarboxylic acids.

Singly unsaturated aliphatic dicarboxylic acids used are preferably those having 4 to 10, more preferably 4 to 8 and very preferably 4 to 6 carbon atoms. With particular preference they are corresponding unsaturated linear aliphatic dicarboxylic acids.

Plurally unsaturated aliphatic dicarboxylic acids used are preferably those having 6 to 18, more preferably 8 to 16 and very preferably 10 to 14 carbon atoms. With particular preference they are corresponding plurally unsaturated linear aliphatic dicarboxylic acids.

The saturated aliphatic dicarboxylic acids are, for example, alkanedioic acids. Preference is given to using saturated alkanedoic acids which contain 4 to 18, more preferably 6 to 14 and very preferably 6 to 10 carbon atoms. With particular preference these are saturated linear alkanedoic acids which contain 4 to 18, more preferably 6 to 14 and very preferably 6 to 10 carbon atoms. Suitable alkanedoic acids are, for example, succinic acid, glutaric acid, adipic acid, pimelic acid, suberic acid, azelaic acid, sebacic acid, undecanedoic acid, dodecanedoic acid, tridecanedoic acid, tetradecanedoic acid and headecanedoic acid, and also their anhydrides, where they exist.

Singly unsaturated aliphatic dicarboxylic acids which can be used include alkenedoic acids which contain 4 to 10, more preferably 4 to 8 and very preferably 4 to 6 carbon atoms. With preference these are corresponding singly unsaturated linear alkenedoic acids. A suitable singly unsaturated linear alkenedoic acid is maleic acid, for example.

Diols

The diols to be used with preference may be aromatic or aliphatic compounds. Aliphatic diols are preferred. With particular preference these are linear or cyclic aliphatic diols. They may be either saturated or singly or plurally unsaturated. Preference is given to saturated linear or saturated cyclic aliphatic diols.

Use may be made, for example, of saturated aliphatic diols having 4 to 18, more preferably 6 to 14 and very preferably 6 to 10 carbon atoms. With preference these are corresponding saturated linear or saturated cyclic aliphatic diols.

Preference is given to using saturated alkanediols or saturated cycloalkanediols. The latter may be monocycloalkanediols, bicycloalkanediols or tricyclo-alkanediols.

Use may be made, for example, of saturated alkanediols having 4 to 18, more preferably 6 to 14 and very preferably 6 to 10 carbon atoms. With preference these are corresponding saturated linear alkanediols. Suitable saturated alkanediols are 1,4-butanediol and 1,6-hexanediol, for example.

It is also possible with preference to use saturated cyclic aliphatic diols having 6 to 18, more preferably 6 to 14 and very preferably 6 to 10 carbon atoms.

It is possible with preference to use saturated cycloalkanediols having 6 to 18, more preferably 6 to 14 and very preferably 6 to 10 carbon atoms. Saturated cycloalkanediols for especially preferred use are tricyclodecanediol, cyclohexyldimethanol and tetramethylcyclobutanediol.

It is further preferred for at least one linear aliphatic diol to be used. It is likewise preferred for at least one linear aliphatic diol and one cyclic aliphatic diol to be used. The molar ratio between the linear aliphatic diol and the cyclic aliphatic diol in that case is preferably 0.5:1.5 to 1.5:0.5, more preferably 0.75:1.25 to 1.25:0.75 and very preferably 0.9:1.1 to 1.1:0.9.

The alpha,omega-hydroxy-functionalized oligoester is prepared using an excess of diols. The molar ratio of dicarboxylic acids to the diols is then for example n:(n+1.1) to n:(n+2), preferably n:(n+1.2) to n:(n+1.8), more preferably n:(n+1.3) to n:(n+1.6) and very preferably n:(n+1.3) to n:(n+1.5), where n denotes the amount of substance of the dicarboxylic acid.

The alpha,omega-hydroxy-functionalized oligoester is prepared in a manner familiar to the skilled person. In order to achieve quantitative conversion of the reactants used, the water formed during the reaction must be removed from the chemical equilibrium. This is accomplished principally through the use of a water separator. The alpha,omega-hydroxy-functionalized oligoester, accordingly, is a polycondensation product. The alpha,omega-hydroxy-functionalized oligoester accordingly comprises a mixture of corresponding oligoesters with different chain lengths.

In one preferred embodiment of the alpha,omega-hydroxy-functionalized oligoester for use in accordance with the invention it is prepared using at least one saturated linear aliphatic dicarboxylic acid, at least one singly unsaturated linear aliphatic dicarboxylic acid and at least one saturated aliphatic diol. The saturated linear aliphatic dicarboxylic acid to be used is preferably a linear alkanedoic acid having 4 to 18, more preferably 6 to 14 and very preferably 6 to 10 carbon atoms. The singly unsaturated linear dicarboxylic acid is preferably a singly unsaturated linear alkenedoic acid having 4 to 10, more preferably to 8 and very preferably 4 to 6 carbon atoms. The saturated aliphatic diol preferably comprises saturated linear alkanediols having 4 to 18, more preferably 6 to 14 and very preferably 6 to 10 carbon atoms, or, likewise preferably, saturated cycloalkanediols having 6 to 18, more preferably 6 to 14 and very preferably 6 to 10 carbon atoms.

Furthermore, when preparing the alpha,omega-hydroxy-functionalized oligoester, it is of course also possible for triols and monohydroxy-functional compounds to be used. For example, aliphatic triols and also aliphatic monohydroxy-functional compounds may be employed. These are preferably corresponding aliphatic hydrocarbon compounds. An example that may be given of a triol is trimethylolpropane. As monohydroxy-functional compounds it is possible to make use, for example, of dodecanol.

In another preferred embodiment, the alpha,omega-hydroxy-functionalized oligoester possesses the following structural formula (I):

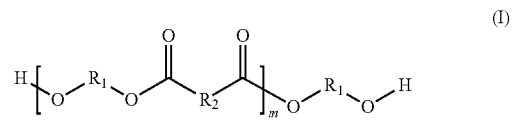

where
  the (m+1) radicals $R_1$ independently of one another are selected from the group of linear or cyclic alkylene radicals,
  the m radicals $R_2$ independently of one another are selected from the group of alkylene and alkenylene radicals, the ratio of alkylene to alkenylene radicals being specifically selected such that said alpha,omega-hydroxy-functionalized oligoester of the structural formula (I) possesses a theoretical carbon-carbon double bond content of 1 to 3 mmol/g, and
  the index m is selected such that the number-average molecular weight of said alpha,omega-hydroxy-functionalized oligoester of the structural formula (I) is 1000 to 3000 g/mol.

The index m in the structural formula (I) is an integer.

The proviso that the index m be selected such that the number-average molecular weight of said alpha,omega-hydroxy-functionalized oligoester of the structural formula (I) should be 1000 to 3000 g/mol is explained below. It shall be assumed that all (m+1) radicals $R_1$ are a hexamethylene radical and half of all m radicals $R_2$ are in each case a tetramethylene radical and the other half are in each case a radical of the formula —CH=CH—. If the number-average molecular weight is 1500 g/mol, for example, then m is on average between 6 and 7.

The number-average molecular weight of the alpha,omega-hydroxy-functionalized oligoester of the structural formula (I) is preferably 1000 to 2800 g/mol and more preferably 1200 to 2600 g/mol.

The weight-average molecular weight of the alpha,omega-hydroxy-functionalized oligoester of the structural formula (I) is preferably 3000 to 8000 g/mol and more preferably 3000 to 7500 g/mol.

The alpha,omega-hydroxy-functionalized oligoester of the structural formula (I) preferably possesses an OH number of 40 to 160 mg KOH/g and more preferably of 70 to 150 mg KOH/g.

The alpha,omega-hydroxy-functionalized oligoester of the structural formula (I) preferably possesses a theoretical carbon-carbon double bond content of 1.4 to 2.5 mmol/g and more preferably of 1.6 to 2.3 mmol/g.

The alpha,omega-hydroxy-functionalized oligoester of the structural formula (I) preferably possesses an acid number of 0 to 10 mg KOH/g, more preferably of 0 to 5 mg KOH/g and very preferably of 0 to 3 mg KOH/g. In theory the acid number of the alpha,omega-hydroxy-functionalized oligoester of the structural formula (I) amounts to 0 mg KOH/g. If said oligoester is prepared from corresponding diols and also corresponding dicarboxylic acids and/or their anhydrides, then it is possible in principle for carboxylic acid groups to be present which have not reacted with a corresponding diol. In such a case, the resulting product mixture would have an acid number of >0 mg KOH/g. In accordance with the above-stated ranges for the acid number, it is preferred for the resulting reaction mixture to possess as few carboxylic acid groups as possible.

The (m+1) radicals $R_1$ are independently of one another selected from the group of linear or cyclic alkylene radicals. If there is more than one kind of radicals $R_1$ present in the alpha,omega-hydroxy-functionalized oligoester of the structural formula (I), the arrangement of said radicals is random. In the case of a linear alkylene radical, it contains preferably 4 to 18, more preferably 6 to 14 and very preferably 6 to 10 carbon atoms. With very particular preference it is a hexamethylene radical. In the case of a cyclic alkylene radical, it preferably contains 6 to 18, more preferably 6 to 14 and very preferably 6 to 10 carbon atoms. With very particular preference it is a tricyclodecane radical.

It is preferred for the alpha,omega-hydroxy-functionalized oligoester of the structural formula (I) to contain precisely one kind of radical $R_1$—that is, either a linear or a cyclic alkylene radical. It is likewise preferred for precisely two kinds of radicals $R_1$ to be present, namely linear and cyclic alkylene radicals. The molar ratio in that case between the linear and the cyclic alkylene radicals is preferably 0.5:1.5 to 1.5:0.5, more preferably 0.75:1.25 to 1.25:0.75 and very preferably 0.9:1.1 to 1.1:0.9.

The m radicals $R_2$ are independently of one another selected from the group of alkylene radicals and alkenylene radicals, the ratio of alkylene radicals to alkenylene radicals being specifically selected such that said alpha,omega-hydroxy-functionalized oligoester of the structural formula (I) possesses a theoretical carbon-carbon double bond content of 1 to 3 mmol/g, preferably of 1.4 to 2.5 mmol/g and very preferably of 1.6 to 2.3 mmol/g. The arrangement of the different kinds of radicals $R_2$ in the alpha,omega-hydroxy-functionalized oligoester of the structural formula (I) is random.

$R_2$ is preferably either a linear alkylene radical or a linear alkenylene radical. It is likewise preferred for the molar ratio between the alkylene and alkenylene radicals to be 0.5:1.5 to 1.5:0.5, more preferably 0.75:1.25 to 1.25:0.75 and very preferably 0.9:1.1 to 1.1:0.9.

If $R_2$ is a linear alkylene radical, it preferably contains 2 to 16, more preferably 4 to 12 and very preferably 4 to 8 carbon atoms. By way of example it is a tetramethylene radical.

$R_2$ may also be a linear alkenylene radical. It is preferably a singly unsaturated linear alkenylene radical containing preferably 2 to 8, more preferably 2 to 6 and very preferably 2 to 4 carbon atoms. With very particular preference it is an alkenylene radical of the structure —CH=CH—.

It is further preferred for all alkylene and all alkenylene radicals to be the same. By this is meant that in said alpha,omega-hydroxy-functionalized oligoester, with regard to the radical $R_2$, there is only one kind of alkylene radicals and only one kind of alkenylene radicals present in each case.

Particularly preferred embodiments are specified below:
a) in one particularly preferred embodiment of the alpha,omega-hydroxy-functionalized oligoester of the structural formula (I) it possesses a number-average molecular weight of 1200 to 2600 g/mol.
b) in another particularly preferred embodiment of the alpha,omega-hydroxy-functionalized oligoester of the structural formula (I) it possesses a weight-average molecular weight of 3000 to 7500 g/mol.
c) in another particularly preferred embodiment of the alpha,omega-hydroxy-functionalized oligoester of the structural formula (I) it possesses an OH number of 70 to 150 mg KOH/g.
d) in another particularly preferred embodiment of the alpha,omega-hydroxy-functionalized oligoester of the structural formula (I) it possesses a theoretical carbon-carbon double bond content of 1 to 3 mmol/g.
e) in another particularly preferred embodiment of the alpha,omega-hydroxy-functionalized oligoester of the structural formula (I) the (m+1) radicals $R_1$ are selected from the group of linear alkylene radicals having 6 to 10 carbon atoms.
f) in another particularly preferred embodiment of the alpha,omega-hydroxy-functionalized oligoester of the structural formula (I) the m radicals $R_2$ are selected from the group of linear alkylene radicals having 4 to 8 carbon atoms and linear alkenylene radicals having 2 to 4 carbon atoms.
g) in another particularly preferred embodiment of the alpha,omega-hydroxy-functionalized oligoester of the structural formula (I) the molar ratio between the linear alkylene radicals and the linear alkenylene radicals is 0.9:1.1 to 1.1:0.9.

In one especially preferred embodiment of the alpha,omega-hydroxy-functionalized oligoester of the invention, all of the features specified under a) to g) are realized in combination.

Filler

It is essential to the invention that the solventborne filler comprises at least one alpha,omega-hydroxy-functionalized oligoester for use in accordance with the invention. In this case the sum of the weight percentage fractions of all the alpha,omega-hydroxy-functionalized oligoesters is 0.5 to 10 wt. %, based on the total amount of the solventborne filler. The sum of the weight percentage fractions of all the alpha,omega-hydroxy-functionalized oligoesters is preferably 1 to 9 wt. %, more preferably 1 to 8 wt. % and very preferably 1.5 to 7.5 wt. % or even 1.5 to 6.5 wt. % based in each case on the total weight of said filler.

Below the lower limit of 0.5 wt. %, the adhesion is not improved. Above the upper limit of 10 wt. %, disadvantages occur, such as yellowing of the resultant coating, for example.

In the solventborne filler of the invention, the sum of the weight percentage fractions of all the alpha,omega-hydroxy-functionalized oligoesters is 0.5 to 10 wt. %, based on the total amount of the solventborne filler. Where preferred embodiments of said alpha,omega-hydroxy-functionalized oligoesters are used, the sum of the weight percentage fractions of all of the preferred embodiments of said alpha,omega-hydroxy-functionalized oligoester is preferably likewise 0.5 to 10 wt. %, based on the total amount of the solventborne filler. With particular preference the only alpha,omega-hydroxy-functionalized oligoesters in the filler of the invention are preferred embodiments of said alpha,omega-hydroxy-functionalized oligoesters.

In one preferred embodiment of the solventborne filler of the invention, the sum of the weight percentage fractions of all the alpha,omega-hydroxy-functionalized oligoesters is 1 to 9 wt. %, based on the total amount of the solventborne filler. Where preferred embodiments of said alpha,omega-hydroxy-functionalized oligoesters are used, the sum of the weight percentage fractions of all of the preferred embodiments of said alpha,omega-hydroxy-functionalized oligoester is preferably likewise 1 to 9 wt. %, based on the total amount of the solventborne filler. With particular preference the only alpha,omega-hydroxy-functionalized oligoesters in the filler of the invention are preferred embodiments of said alpha,omega-hydroxy-functionalized oligoesters.

In one particularly preferred embodiment of the solventborne filler of the invention, the sum of the weight percentage fractions of all the alpha,omega-hydroxy-functionalized oligoesters is 1 to 8 wt. %, based on the total amount of the solventborne filler. Where preferred embodiments of said alpha,omega-hydroxy-functionalized oligoesters are used, the sum of the weight percentage fractions of all of the preferred embodiments of said alpha,omega-hydroxy-functionalized oligoester is preferably likewise 1 to 8 wt. %, based on the total amount of the solventborne filler. With particular preference the only alpha,omega-hydroxy-functionalized oligoesters in the filler of the invention are preferred embodiments of said alpha,omega-hydroxy-functionalized oligoesters.

In one especially preferred embodiment of the solventborne filler of the invention, the sum of the weight percentage fractions of all the alpha,omega-hydroxy-functionalized oligoesters is 1.5 to 7.5 wt. %, based on the total amount of the solventborne filler. Where preferred embodiments of said alpha,omega-hydroxy-functionalized oligoesters are used, the sum of the weight percentage fractions of all of the preferred embodiments of said alpha,omega-hydroxy-functionalized oligoester is preferably likewise 1.5 to 7.5 wt. %, based on the total amount of the solventborne filler. With particular preference the only alpha,omega-hydroxy-functionalized oligoesters in the filler of the invention are preferred embodiments of said alpha,omega-hydroxy-functionalized oligoesters.

In one likewise especially preferred embodiment of the solventborne filler of the invention, the sum of the weight percentage fractions of all the alpha,omega-hydroxy-functionalized oligoesters is 1.5 to 6.5 wt. %, based on the total amount of the solventborne filler. Where preferred embodiments of said alpha,omega-hydroxy-functionalized oligoesters are used, the sum of the weight percentage fractions of all of the preferred embodiments of said alpha,omega-hydroxy-functionalized oligoester is preferably likewise 1.5 to 6.5 wt. %, based on the total amount of the solventborne filler. With particular preference the only alpha,omega-hydroxy-functionalized oligoesters in the filler of the invention are preferred embodiments of said alpha,omega-hydroxy-functionalized oligoesters.

As an example of embodiments of the alpha,omega-hydroxy-functionalized oligoester that are preferred in this sense, mention may be made of the alpha,omega-hydroxy-functionalized oligoester of structural formula (I).

As further examples of embodiments of the alpha,omega-hydroxy-functionalized oligoester of the invention that are preferred in this sense, mention may be made of the particularly preferred embodiments below:

a) in one preferred embodiment of the alpha,omega-hydroxy-functionalized oligoester of the structural formula (I) it possesses a number-average molecular weight of 1200 to 2600 g/mol.

b) in another preferred embodiment of the alpha,omega-hydroxy-functionalized oligoester of the structural formula (I) it possesses a weight-average molecular weight of 3000 to 7500 g/mol.

c) in another preferred embodiment of the alpha,omega-hydroxy-functionalized oligoester of the structural formula (I) it possesses an OH number of 70 to 150 mg KOH/g.

d) in another preferred embodiment of the alpha,omega-hydroxy-functionalized oligoester of the structural formula (I) it possesses a theoretical carbon-carbon double bond content of 1 to 3 mmol/g.

e) in another preferred embodiment of the alpha,omega-hydroxy-functionalized oligoester of the structural formula (I) the (m+1) radicals $R_1$ are selected from the group of linear alkylene radicals having 6 to 10 carbon atoms.

f) in another preferred embodiment of the alpha,omega-hydroxy-functionalized oligoester of the structural formula (I) the m radicals $R_2$ are selected from the group of linear alkylene radicals having 4 to 8 carbon atoms and linear alkenylene radicals having 2 to 4 carbon atoms.

g) in another preferred embodiment of the alpha,omega-hydroxy-functionalized oligoester of the structural formula (I) the molar ratio between the linear alkylene radicals and the linear alkenylene radicals is 0.9:1.1 to 1.1:0.9.

An embodiment of the alpha,omega-hydroxy-functionalized oligoester that is likewise preferred in this sense is that in which all of the features specified under a) to g) are realized in combination.

The solids content of the filler may be ascertained by weighing out a sample of approximately 2 g into a pre-dried aluminum dish and drying it in a drying cabinet at 125° C. for 60 minutes before cooling it in a desiccator and then weighing it again. The residue, relative to the total amount of sample used, corresponds to the solids fraction. The solid was determined in accordance with EN ISO 3251 (1-2 g 1 h 125° C.)

The solventborne fillers which can be used are those familiar to the skilled person. Said filler comprises at least one organic polymer as binder. These organic polymers are, for example, the polyester resins and/or polyacrylate and polymethacrylate resins (referred to hereinafter as poly(meth)acrylate resins) that are known to the skilled person. The stated organic polymers as binders preferably further comprise different functional groups for chemical crosslinking, with hydroxyl groups being preferred. Preference is given to using as binders polyester resins and/or poly(meth) acrylate resins which preferably comprise hydroxyl groups. Such organic polymers and resins are described for example in Römpp-Lexikon Lacke und Druckfarben, Georg Thieme Verlag, Stuttgart, N.Y., 1998, pages 73 to 74. Polyesters produce particularly flexible fillers. Poly(meth)acrylate resins are preferred because they dry physically more quickly and ultimately allow earlier working. In addition, it is also possible to use epoxy resins as well. They are described for example in Römpp-Lexikon Lacke und Druckfarben, Georg Thieme Verlag, Stuttgart, N.Y., 1998, pages 196 to 197. An epoxy resin whose use is preferred in this sense is Epikot 1001.

Polyisocyanate adducts can be used as crosslinkers. As polyisocyanate adducts, on account of their low viscosity and enhanced weather resistance, use is made of aliphatic and also cycloaliphatic polyisocyanate adducts. These are products which are also used in the two-component clearcoat materials in automotive OEM finishing. The polyisocyanate adducts used are typically oligomers of diisocyanates. Said polyisocyanate adducts are based for example on hexamethylene diisocyanate (HMDI), isophorone diisocyanate (IPDI), diphenylmethane diisocyanate (MDI) and tetramethylxylyl diisocyanate (TMXDI). In addition, however, it is also possible to use all common diisocyanates that are known to the skilled person. The techniques for the oligomerization involve the formation of various adducts: urethanes, allophanates, biuret, uretdiones and, preferably, isocyanurates. Particularly preferred for their viscosity is the use of isocyanurate trimers of hexamethylene diisocyanate.

The fraction of all the film-forming components, more particularly the hydroxy-functional polyester resin and/or poly(meth)acrylate resin and the polyisocyanate adduct as crosslinker, is advantageously in the range from 10 to 90 wt. %, preferably from 15 to 60 wt. %, more preferably in the range from 20 to 50 wt. %, based in each case on the total amount of the solventborne filler. The fraction of each resin as binder considered separately and also of each crosslinker is advantageously not below 3 wt. %, based on the total amount of the solventborne filler.

Typically it is necessary to catalyze the crosslinking reaction. Organotin salts are almost always used for this purpose. In the context of the present invention, preference is given to using dibutyltin dilaurate, since on account of its relatively long-chain acid radical it is especially compatible with the binder and then later on with the film matrix.

The pigmentation system for the fillers typically consists of titanium dioxide, iron oxide pigment and carbon black. In addition, suitable filling materials are present. Filling materials which can be used are the customary filling materials that may be employed within the paint industry. Filling materials are described for example in Römpp-Lexikon Lacke and Druckfarben, Georg Thieme Verlag, Stuttgart, N.Y., 1998, pages 250 to 252. Besides these, corrosion inhibitors such as silicates, orthophosphates and polyphosphates, for example, are typically employed. Only for special cases are colored fillers produced that support the planned shade for the topcoat. The fillers normally have various gray shades, produced by fractions of pigmentary carbon blacks and iron oxides (usually yellow iron oxide).

Furthermore, the filler of the invention comprises organic solvents. Examples of those that may be included are aliphatic and/or aromatic hydrocarbons such as toluene, xylene, solvent naphtha, Solvesso 100, Shellsol A, ketones, such as acetone, methyl ethyl ketone or methyl amyl ketone, esters, such as ethyl acetate, butyl acetate, methoxypropyl acetate, butyl glycol acetate, pentyl acetate or ethyl ethoxypropionate, ethers such as butyl glycol, dipropylene glycol methyl ether, alcohols such as ethylhexanol, butoxypropanol, isopropanol or butyl diglycol, or mixtures of the aforementioned solvents.

Moreover, the filler in question is a solventborne filler. The term "solventborne" is to be understood below to mean that organic solvents, and no water, are used as solvents. More particularly, the water content of the solventborne filler of the invention is to be not greater than 5 wt. % and especially not greater than 2 wt. %, based in each case on the total amount of the solventborne filler of the invention.

Said filler may further comprise at least one conventional coatings additive. By way of example, but not exclusively, such coatings additives are
 defoamers,
 polymerization inhibitors,
 slip additives,
 wetting agents such as siloxanes, fluorine-containing compounds, carboxylic monoesters,
 leveling agents,
 rheology control additives,
 dispersants,
 corrosion inhibitors,
 and/or flame retardants.

The present invention further provides a process for producing a multicoat paint system on a substrate, comprising
(A) applying the solventborne filler of the invention to a substrate, to give a first coat,
(B) drying the coat applied in (A),
(C) applying a topcoat,
(D) jointly curing the coats applied in (A) and (C).

All of the particular features already discussed above with regard to the solventborne filler of the invention are likewise preferred for the process of the invention that is under discussion.

Topcoat

It is possible to use the solventborne topcoat materials that are familiar to the skilled person. Said topcoat material comprises at least one organic polymer as binder. These organic polymers are, for example, the polyester resins and/or polyacrylate and polymethacrylate resins (referred to below as poly(meth)acrylate resins) that are known to the skilled person. The stated organic polymers as binders preferably additionally comprise different functional groups for chemical crosslinking, with hydroxyl groups being preferred. Poly(meth)acrylate resins are used with preference on account of their significantly better initial drying rate as compared with polyesters. Particular preference is given to using poly(meth)acrylate resins which have been modified with glycidyl esters of branched, saturated fatty acids. This raises the pigment take-up capacity of the resins.

Crosslinkers used are aliphatic polyisocyanate adducts of low viscosity, which have already been discussed in connection with the description of the solventborne filler of the invention. Here as well, very particular preference is given to using isocyanurate trimers of hexamethylene diisocyanate.

Typically it is necessary to catalyze the crosslinking reaction. Organotin salts are used with preference for that purpose. In the sense of the present invention it is particularly preferred for dibutyltin dilaurate to be used, since on account of its relatively long-chain acid radical it is particularly compatible with the binder and then later on with the film matrix.

Said topcoat material further comprises at least one customary and known, color-imparting and/or effect-imparting pigment. Pigments that may be selected are in principle the same as those also used by the skilled person for automotive OEM finishing.

Examples of such pigments are inorganic-based pigments, such as titanium dioxide, iron oxide and carbon black, for example, or else customary metal pigments (for example commercial aluminum bronzes, stainless steel bronzes) and nonmetallic effect pigments (for example pearlescent pigments and/or interference pigments). Color-imparting pigments on an organic basis as well, such as azo pigments and phthalocyanine pigments, may be employed.

Solvents which can be used are all those already identified above in connection with the solventborne filler of the invention.

Substrates

The solventborne filler of the invention is preferentially suitable for the coating of metal substrates. Suitable metal substrates are all those familiar to the skilled person, such as, for example, aluminum, iron, zinc and magnesium and also alloys thereof. Particularly preferred are substrates of aluminum or steel.

Depending on material, the metal substrates may also be provided with an electrocoat; as in the case of steel, for example. If, on the other hand, an aluminum substrate is used, it is preferably not provided with an electrocoat, but is instead abraded before the filler is applied.

As well as metallic substrates, all customary thermoset or thermoplastic substrates known to the skilled person may also be coated.

Production of the Coatings

Prior to the application of the filler there are typically in each case one curing component, one filler component and one thinner component present. The curing component here comprises the crosslinking agent; the filler component, the binder and also corresponding pigments and fillers; and the thinner component, corresponding solvents. Shortly prior to application, these three components are mixed with one another in a ratio familiar to the skilled person and the resulting filler is applied. In principle it is possible to use any typical application methods, such as spraying, knifecoating, spreading, pouring, dipping, impregnating, trickling or rolling, for example. Spray application is preferred.

At application, the substrate to be coated may itself be stationary, with the application means or unit being moved. Preference is given to employing spray application methods, such as compressed air spraying (pneumatic application), airless spraying, high-speed rotation, electrostatic spray application (ESTA), optionally in conjunction with hot spray application such as hot air spraying, for example.

Which form of the aforementioned application methods is employed will be dependent on factors including whether the solventborne filler of the invention is being used, for example, in refinish or in the finishing of commercial vehicles.

Application of the solventborne filler of the invention takes place in the customary and known coat thicknesses, as for example in wet film thicknesses of 10 to 400 micrometers, preferably of 80 to 250 micrometers. The resultant dry film thicknesses after curing are then, for example, in the range from to 100 micrometers, more particularly 40 to 80 micrometers.

It is usual to apply a topcoat over the applied filler coat. The filler coat is preferably dried before the topcoat is applied. This drying may take place for example at room temperature for 5 to 90 minutes, preferably 10 to 70 minutes and very preferably 20 to 50 minutes.

The general methods for applying the topcoat correspond to those described earlier on above for the solventborne filler of the invention.

The topcoat is applied in the customary and known coat thicknesses, as for example in wet film thicknesses of 10 to 350 micrometers, preferably of 100 to 250 micrometers. The resultant dry film thicknesses after curing are then, for example, in the range from 15 to 95 micrometers, more particularly 30 to 80 micrometers. With particular preference the filler coat after curing possesses a dry film thickness of 60 to 70 micrometers, and the topcoat a dry film thickness of 40 to 70 micrometers.

The curing of filler and topcoat takes place jointly. There are no peculiarities of method to this curing, which instead takes place in accordance with the customary and known methods such as heating in a forced-air oven, for example.

Thus, for example, curing may take place in the region of room temperature or else at elevated temperatures in the range from, for example, 40° C. to 100° C., preferably from 50° C. to 90° C. Curing may take place for example over a period of 5 to 120 minutes, preferably 10 to 40 minutes. Curing may optionally also be preceded by a flash-off phase or preliminary-drying phase, for example at room temperature for a period of 1 to 60 minutes.

The multicoat paint systems produced using the solventborne filler of the invention exhibit excellent adhesion between filler coat and topcoat. If, for example, the resultant coating is exposed to weathering, then, after an appropriate regeneration time, there is no significant deterioration observable in the adhesion between filler coat and topcoat. Furthermore, the solventborne fillers of the invention have an excellent shelf life.

The fillers of the invention are especially suitable for application in the finishing of commercial vehicles and also in refinish, more particularly the refinishing of commercial vehicles.

The present invention further relates to a multicoat paint system on a substrate, comprising one above another in this order (A) at least one first coat, resulting from the application of the solventborne filler of the invention, and
(B) at least one topcoat.

Substrates which can be used are for example all of those specified above. All of the special features already discussed above in relation to the solventborne filler of the invention are likewise preferred for the multicoat paint system of the invention. The composition of a topcoat to be used accordingly has already been described above. The multicoat paint system of the invention can be produced as already described above.

The present invention, lastly, also relates to the use of at least one alpha,omega-hydroxy-functionalized oligoester for improving adhesion in a solventborne filler, where said alpha,omega-hydroxy-functionalized oligoester possesses an OH number of 30 to 160 mg KOH/g, a theoretical carbon-carbon double bond content of 1 to 3 mmol/g, a number-average molecular weight of 1000 to 3000 g/mol and a weight-average molecular weight of 2800 to 10 000 g/mol, moreover, the sum of the weight percentage fractions of all the alpha,omega-hydroxy-functionalized oligoesters being 0.5 to 10 wt. %, based on the total amount of the solventborne filler.

All of the special features already discussed above in relation to the solventborne filler of the invention are likewise preferred for the inventive use that is under discussion.

By improvement in adhesion is meant an improvement in the adhesion as compared with fillers that do not include an alpha,omega-hydroxy-functionalized oligoester of the invention.

The adhesion can be ascertained, for example, by means of the cross-cut of DIN 2409 or the steam jet test of DIN EN ISO 66552. The alpha,omega-hydroxy-functionalized oligoester of the invention is preferably used for improving the adhesion between filler coat and topcoat. Likewise preferably, the alpha,omega-hydroxy-functionalized oligoester of the invention is used for improving the adhesion between filler coat and topcoat after weathering. Such weathering can be simulated, for example, by the constant climate test in accordance with DIN EN ISO 6270-2 CH.

The said alpha,omega-hydroxy-functionalized oligoester is used preferably for improving the adhesion in the refinish or finish of commercial vehicles. The said alpha,omega-hydroxy-functionalized oligoester may also be used for improving the adhesion in the refinish of commercial vehicles.

The term "refinish" comprehends the refinishing which takes place for example in a workshop, for the purpose of repairing existing finishes that have become damaged. Defects in paints may in principle occur even directly after OEM finishing has taken place. In that case the term "OEM refinish" is used. The fillers of the invention may likewise be used in OEM refinish. In both cases the fillers of the invention are also suitable for repairing small defects, known as "spots". Such a procedure is also referred to as "spot repair".

Measurement Methods

Determination of Solids:

Determining the solids of coating compositions takes place in accordance with EN ISO 3251 (1 to 2 g, 1 hour, 125° C.). It involves weighing out around 2 g of sample into a pre-dried aluminum dish, drying it in a drying cabinet at 125° C. for 60 minutes before cooling it in a desiccator and then reweighing it. The residue, relative to the total amount of the sample employed, corresponds to the solids fraction.

Determining the solids of the alpha-omega-hydroxy-functionalized oligomers of the invention takes place in accordance with EN ISO 3251 (1 g, 1 hour, 130° C.). It involves weighing out 1 g of sample into a pre-dried aluminum dish, drying it in a drying cabinet at 130° C. for 60 minutes before cooling it in a desiccator and then reweighing it. The residue, relative to the total amount of the sample employed, corresponds to the solids fraction.

Determination of Acid Number:

The acid number is determined in accordance with DIN 53402. The free acids present in the sample are titrated with a potassium hydroxide standard solution in the presence of a color indicator. The acid number corresponds to the mass of potassium hydroxide, in mg, that is need to neutralize 1 g of test material under specified conditions.

Determination of OH Number:

The OH number is determined in accordance with DIN 53240. The OH groups are reacted by acetylation with an excess of acetic anhydride. The excess acetic anhydride is subsequently cleaved into acetic acid by addition of water, and the total acetic acid is back-titrated with ethanolic KOH. The OH number indicates the amount of KOH, in mg, which is equivalent to the amount of acetic acid bound in the acetylation of 1 g of substance.

Determination of Number-Weighted and Mass-Weighted Molecular Weights:

The number-weighted and mass-weighted molecular weights were determined by means of gel permeation chromatography, with tetrahydrofuran as eluent and using a polystyrene standard. The column material consists of styrene-divinylbenzene copolymers.

The invention is elucidated in more detail by the examples which follow.

EXAMPLES 1.a Preparation of the alpha,omega-Hydroxy-Functionalized Oligoester (A) for Use in Accordance with the Invention The reactants identified in Table 1a were reacted as set out below in the stated amounts of substance.

First of all, maleic anhydride (MAn), adipic acid (AD) and 1,6-hexanediol (HD) were charged to a 4-liter reactor made from stainless steel and equipped with a column, a condenser and a water separator. This was followed by addition of 3% of xylene as azeotrope former and 0.1% of methylhydroquinone (the percentage figures are based on the amount of MAn, AD and HD used). The resulting reaction mixture was heated up under lean air over the course of 5 hours. Throughout the reaction time, the temperature of the reaction mixture did not exceed 230° C. When an acid number of 2 mg KOH/g had been reached, the reaction mixture was cooled to 80° C. The resulting alpha,omega-hydroxy-functionalized oligoester (A) had the following characteristics:

OH number: 65 mg KOH/g

Number-average molecular weight: 1412 g/mol

Weight-average molecular weight: 3313 g/mol

Theoretical carbon-carbon double bond content: 1.86 mmol/g

TABLE 1a

Amounts of substance of the reactants to be used, in mol.

| | Raw substance | Amount of substance |
|---|---|---|
| 1 | MAn | 5.05 |
| 2 | AD | 5.53 |
| 3 | HD | 14.46 |
| Solids [%] | | 97 |

1.b Preparation of the alpha,omega-Hydroxy-Functionalized Oligoester (B) for Use in Accordance with the Invention The reactants identified in Table 1b were reacted as set out under 1.a in the stated amounts of substance. The resulting alpha,omega-hydroxy-functionalized oligoester (B) had the following characteristics:

OH number: 82 mg KOH/g

Number-average molecular weight: 2465 g/mol

Weight-average molecular weight: 7257 g/mol

Theoretical carbon-carbon double bond content: 2.25 mmol/g

TABLE 1b

Amounts of substance of the reactants to be used, in mol.

| | Raw substance | Amount of substance |
|---|---|---|
| 1 | MSA | 3.24 |
| 2 | AD | 2.88 |
| 3 | HD | 7.32 |
| Solids [%] | | 97.6 |

2. Preparation of a Filler Comprising the Alpha,Omega-Hydroxy-Functionalized Oligoester for Use in Accordance with the Invention A commercially customary filler was used. It is composed of the three components of filler component, curing agent and thinner. The respective compositions of these components are shown in Table 2. The filler component, curing agent and thinner components are used in a ratio of 100:13.5:12.3, said ratio being based on the weight of the components. This produces the total amount of the filler. 2, 4 and 6 wt. % each of the oligoester (additive) for use in accordance with the invention, relative to the total amount of the filler, are used either in the filler component or in the thinner.

TABLE 2 composition of the filler used (filler component, curing agent, thinner). The wt. % figure is based in each case on the total amount of the filler component, the curing agent and the thinner.

| Curing agent | | Filler component | | Thinner | |
|---|---|---|---|---|---|
| Component | wt. % | Component | wt. % | Component | wt. % |
| Desmodur N3390 (commercial HDI trimer) | 50.5 | Parocryl VP7 56101 (commercial dispersion of an OH-functional acrylate resin in organic solvents, acrylate resin content: 54.75 wt. %) | 23.3 | 1-Methoxy-propyl acetate | 45.5 |
| Xylene | 5.0 | | | Butyl acetate 98-100% | 30.0 |
| Butyl acetate 98-100% | 23.7 | | | Xylene | 20.0 |
| 1-methoxypropyl acetate | 9.0 | | | Butyl glycol acetate | 2.0 |
| | | Xylene | 4.5 | | |
| Silquest A-187 (gamma-glycidyl-oxypropyltrimethoxy silane) | 3.6 | Solvent naphtha | 3.5 | Ethyl 3-ethoxy-propionate | 1.5 |
| | | Nuosperse FA 601 (wetting and dispersing agent) | 0.2 | | |
| | | 1-methoxypropyl acetate | 3.2 | | |
| Baysilon OL 44 (interface additive) | 0.7 | Aerosil 380 (hydrophilic fumed silica) | 0.2 | | |
| | | Bentone 34, 100% (rheology additive) | 1.6 | | |
| Dibutyltin dilaurate (1% strength in organic solvents) | 7.5 | 1-Methoxypropyl acetate | 0.6 | | |
| | | Lamp black 101 (carbon black pigment) | 0.1 | | |
| | | Bayferrox 920 (yellow iron pigment) | 1.8 | | |
| | | Incomp KL 30 (mineral based on talc and dolomite) | 6.5 | | |
| | | Heucophos ZPO (anticorrosion pigment) | 12.4 | | |
| | | Luzenac 10MO (magnesium silicate) | 9.2 | | |
| | | Titanium rutile | 12.5 | | |
| | | Shieldex AC 3 (anticorrosion pigment) | 6.6 | | |
| | | Butyl glycol acetate | 1.5 | | |
| | | 1-Methoxypropyl acetate | 2.7 | | |
| | | Xylene | 0.4 | | |
| | | Leveling agent | 0.5 | | |
| | | Baysilone fluid OL 44 (interface additive) | 0.1 | | |
| | | Epoxy resin: 75% strength in xylene | 8.6 | | |

3. Production of Coated Substrates

Substrates used were aluminum panels in each case in the form of test plates having a size of 10×20×0.45 cm. The panels were first abraded in order to free the surface from aluminum oxide. This was done using P600 to P400 grade abrasive paper.

The filler was applied by pneumatic spray application. The resultant filler coat was subsequently dried at room temperature for 60 minutes.

Then a topcoat material was applied by pneumatic spray application. The composition of said topcoat is given by a mixture of the three components of topcoat component, curing agent and thinner, used in a ratio of 100:19.5:16, said ratio being based on the weight of the components. The compositions of said components of the topcoat used are shown in Table 3.

This is followed by drying of the resultant topcoat at room temperature for 10 minutes, followed by the joint curing of filler coat and topcoat in a forced-air oven at 60° C. for 30 minutes.

In the resulting substrate, the filler coat had a dry film thickness of 55 micrometers and the topcoat had a dry film thickness of 66 micrometers.

TABLE 3

Composition of the topcoat used (topcoat component, curing agent, thinner). The wt. % figure is based in each case on the total amount of the topcoat component, the curing agent and the thinner.

| Curing agent | | Filler component | | Thinner | |
|---|---|---|---|---|---|
| Component | wt. % | Component | wt. % | Component | wt. % |
| Desmodur N3600 (commercial HDI trimer) | 90.0 | Acrylique 324 (commercial dispersion of an OH-functional acrylate resin in organic solvents, acrylate resin content: 60 wt. %) | 18.70 | 1-Methoxypropyl acetate | 46.5 |
| Butyl acetate 98-100% | 10.0 | | | Butyl acetate 98-100% | 30.0 |
| | | | | Xylene | 20.0 |
| | | | | Butyl glycol acetate | 2.0 |
| | | Uno TSA Acrylic (commercial dispersion of an OH-functional acrylate resin in organic solvents, acrylate resin content: 65 wt. %) | 15.26 | Ethyl 3-ethoxypropionate | 1.5 |
| | | Disperbyk 180 (wetting and dispersing additive) | 0.97 | | |
| | | Aerosil R972 (hydrophobic fumed silica) | 0.32 | | |
| | | Bentone 34, 100% (rheology additive) | 0.24 | | |
| | | Titanium rutile (Tiona 595) | 39.04 | | |
| | | Xylene | 2.92 | | |
| | | Butyl acetate 98-100% | 3.17 | | |
| | | Polyester-based mixing varnish | 17.88 | | |
| | | Solvent naphtha 165/185 | 0.57 | | |
| | | Acrylate-based, ocher-colored tinting paste | 0.78 | | |
| | | Acrylate-based black tinting paste | 0.15 | | |

4. Investigation of Adhesion Properties

The adhesion properties of the coatings produced were investigated by means of cross-cut (DIN 2409) once immediately after application and once after 16-hour storage of the coated substrate at 40° C.

The adhesion was evaluated using a grading system with grades of 0 to 5, with a grade of 0 being awarded for coatings which after adhesion testing showed no visible traces (very good adhesion), and a rating of 5 being awarded for coatings which after the adhesion test exhibited significantly detached regions (inadequate adhesion).

Table 4 shows the adhesion properties of the coatings produced, for different concentrations of the additive. Accordingly, the use of the additive either in the filler component or in the thinner has no significant effect on the performance of the additive. Moreover, a substantial improvement in the adhesion can be achieved through the use of the additive.

TABLE 4

Adhesion properties of the additized filler (additive located in the filler component or in the thinner) directly after application and after 16-hour storage of the coated substrate at 40° C.

| | Directly after application | | | 16 h after application at 40° C. | | |
|---|---|---|---|---|---|---|
| Substrate | % by weight of additive | Adhesion | Substrate | % by weight of additive | Adhesion |
| No additive | 0 | 2 | No additive | 0 | 3 |
| Additive in thinner | 2 | 0.5 | Additive in thinner | 2 | 0.5 |
| | 4 | 0 | | 4 | 0.5 |
| | 6 | 0 | | 6 | 0 |
| No additive | 0 | 1 | No additive | 0 | 3 |
| Additive in filler component | 2 | 0 | Additive in filler component | 2 | 0.5 |
| | 4 | 0.5 | | 4 | 0 |
| | 6 | 0 | | 6 | 0 |

Adhesion after Constant Climate Test

The same coated substrates as those already described above were produced and were then subjected to weathering in a climate chamber (constant climate test in accordance with DIN EN ISO 6270-2 CH). In this test, the samples were stored in the climate chamber at 100% atmospheric humidity and 40° C. for 10 days. Subsequently, the adhesion of the samples was investigated by means of a steam jet test (DIN EN ISO 66552) 1 h, 3 h and 24 h following removal from the climate chamber. In the steam jet test, a jet of steam is directed perpendicularly onto the test specimen from a distance of 10 cm at 67 bar with a temperature of 60° C. for one minute. For each coating, a total of 6 samples are produced and each investigated individually. The average was then formed. The results are set out in Table 5. Accordingly, the use of the additive either in the filler component or in the thinner has no significant effect on the performance of the additive. Moreover, a substantial improvement in the adhesion can be achieved through the use of the additive.

TABLE 5

Adhesion properties of the additized filler after exposure in a constant climate chamber (additive located in the filler or in the thinner).

| Substrate | % by weight of additive | Adhesion 1 h | 3 h | 24 h |
|---|---|---|---|---|
| No additive | 0 | 4 | 4 | 4 |
| Additive in thinner | 2 | 3 | 3 | 3 |
|  | 4 | 0 | 1 | 1 |
|  | 6 | 0 | 0 | 0.5 |
| No additive | 0 | 5 | 4 | 4 |
| Additive in filler component | 2 | 2 | 3 | 1 |
|  | 4 | 0.5 | 0.5 | 1 |
|  | 6 | 0 | 0.5 | 0.5 |

6. Effect of Storage

The filler component in accordance with Table 2 was additized as described above with 5% of the alpha,omega-hydroxy-functionalized oligoester (A) and alpha,omega-hydroxy-functionalized oligoester (B), based on the total amount of the filler. The filler component obtained in this way was stored at room temperature for a total of seven months. After one, three, five and seven months, corresponding substrates were produced as described in section 3. These substrates were stored for 10 days in a constant climate chamber, as set out in section 5, and the adhesion was then investigated using a steam jet test, following a regeneration time of 24 h. The results are set out in Table 6. Accordingly, no deterioration in the resultant adhesion properties can be found even after a number of months of storage of the filler component comprising the additive.

TABLE 6

Adhesion properties of the additized filler after exposure in a constant climate chamber (different months); the entry (B) relates to the alpha, omega-hydroxy-functionalized oligoester (B) and the entry (A) to the alpha,omega-hydroxy-functionalized oligoester (A).

| Time (Months) | Additive | Adhesion |
|---|---|---|
| 0 | No additive | 3.0 |
|  | (A) | 0.5 |
|  | (B) | 0.5 |
| 1 | No additive | 4.0 |
|  | (A) | 0.5 |
|  | (B) | 0.5 |
| 3 | No additive | 4.0 |
|  | (A) | 0.5 |
|  | (B) | 0.5 |
| 5 | No Additive | 4.0 |
|  | (A) | 0.0 |
|  | (B) | 0.5 |
| 7 | No additive | 3.0 |
|  | (A) | 0.5 |
|  | (B) | 0.5 |

The invention claimed is:

1. A solventborne filler comprising at least one alpha, omega-hydroxy-functionalized oligoester which possesses an OH number of 30 to 160 mg KOH/g, a theoretical carbon-carbon double bond content of 1 to 3 mmol/g, a number-average molecular weight of 1000 to 3000 g/mol and a weight-average molecular weight of 2800 to 10 000 g/mol, the sum of the weight percentage fractions of all the alpha, omega-hydroxy-functionalized oligoesters being 0.5 to 10 wt. %, based on the total amount of the solventborne filler.

2. The solventborne filler according to claim 1, wherein the at least one alpha, omega-hydroxy-functionalized oligoester has an acid number in the range of 0 to 10 mg KOH/g.

3. The solventborne filler according to at claim 1, wherein the alpha, omega-hydroxy-functionalized oligoester is prepared using at least one saturated linear aliphatic dicarboxylic acid or its anhydride, at least one singly unsaturated linear aliphatic dicarboxylic acid or its anhydride, and at least one saturated aliphatic diol.

4. The solventborne filler according to claim 1, wherein the sum of the weight percentage fractions of all the alpha, omega-hydroxy-functionalized oligoesters is 1.5 to 7.5 wt. %, based on the total amount of the solventborne filler.

5. The solventborne filler according to claim 1, wherein the alpha, omega-hydroxy-functionalized oligoester possesses the following structural formula (I):

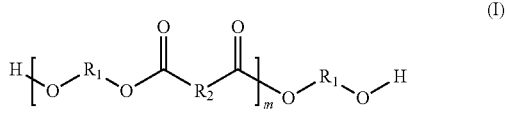

wherein
the (m+1) radicals $R_1$ independently of one another are selected from the group of linear or cyclic alkylene radicals,
the m radicals $R_2$ independently of one another are selected from the group of alkylene and alkenylene radicals, the ratio of alkylene to alkenylene radicals being specifically selected such that the alpha, omega-hydroxy-functionalized oligoester of the structural formula (I) possesses a theoretical carbon-carbon double bond content of 1 to 3 mmol/g, and the index m is selected such that the number-average molecular weight of said alpha,omega-hydroxy-functionalized oligoester of the structural formula (I) is 1000 to 3000 g/mol.

6. The solventborne filler according to claim 5, wherein the (m+1) radicals R1 of formula (I) are selected from the group consisting of linear alkylene radicals having 6 to 10 carbon atoms.

7. The solventborne filler according to claim 5, wherein the m radicals $R_2$ of formula (I) are selected from the group consisting of linear alkylene radicals having 4 to 8 carbon atoms and linear alkenylene radicals having 2 to 4 carbon atoms.

8. The solventborne filler according to claim 5, wherein the alpha, omega-hydroxy-functionalized oligoester possesses a number-average molecular weight of 1200 to 1800 g/mol.

9. The solventborne filler according to claim 5, wherein the alpha, omega-hydroxy-functionalized oligoester possesses a weight-average molecular weight of 3000 to 6000 g/mol.

10. The solventborne filler according to claim 5, wherein the alpha, omega-hydroxy-functionalized oligoester has an OH number of 70 to 150 mg KOH/g.

11. The solventborne filler according to claim 5, wherein the alpha, omega-hydroxy-functionalized oligoester possesses a theoretical carbon-carbon double bond content of 1.4 to 2.5 mmol/g.

12. A multicoat paint system on a substrate, comprising one above the other in this order:
(A) at least one first coat, resulting from the application of the solventborne filler according to claim 1, and
(B) at least one topcoat.

13. A process for producing a multicoat paint system on a substrate, comprising
(A) applying the solventborne filler according to claim 1 to a substrate, to give a first coat,
(B) drying the coat applied in (A),
(C) applying a topcoat,
(D) jointly curing the coats applied in (A) and (C).

14. A method for improving adhesion in a solventborne filler comprising:
mixing at least one alpha, omega-hydroxy-functionalized oligoester having an OH number of 30 to 160 mg KOH/g, a theoretical carbon-carbon double bond content of 1 to 3 mmol/g, a number-average molecular weight of 1000 to 3000 g/mol and a weight-average molecular weight of 2800 to 10 000 g/mol, the sum of the weight percentage fractions of all the alpha, omega-hydroxy-functionalized oligoesters being 0.5 to 10 wt. %, based on the total amount of the solventborne filler with one or more solventborne filler components to form the solventborne filler.

15. The method according to claim 14, wherein the alpha, omega-hydroxy-functionalized oligoester is used for improving adhesion in solventborne fillers in refinish or in the finishing of commercial vehicles.

* * * * *